May 17, 1955  J. OTRADOVEC  2,708,464
PORTABLE TIMBER CUTTING SAW APPARATUS
Filed July 31, 1953  2 Sheets-Sheet 1
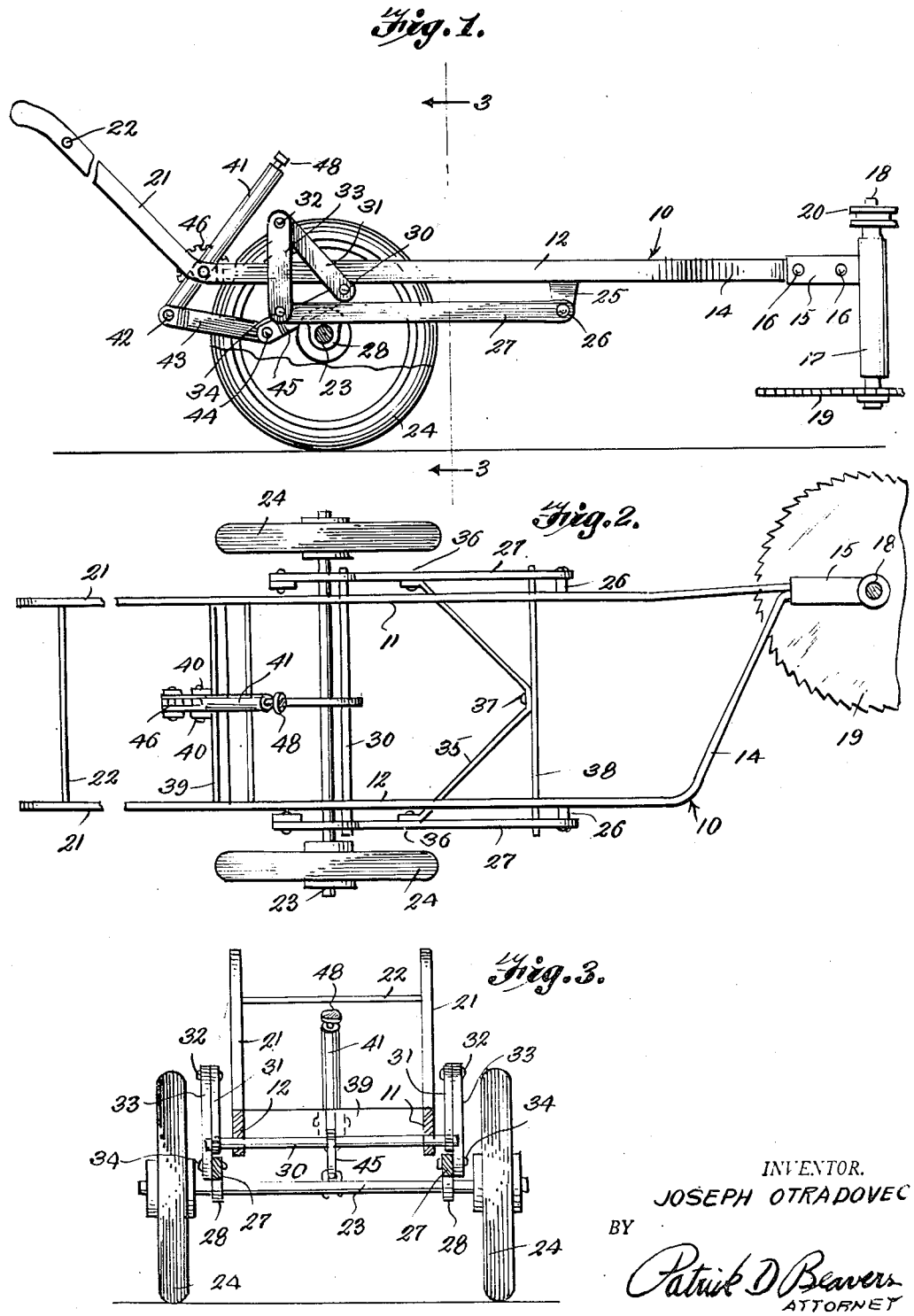
INVENTOR.
JOSEPH OTRADOVEC
BY
Patrick D Beavers
ATTORNEY

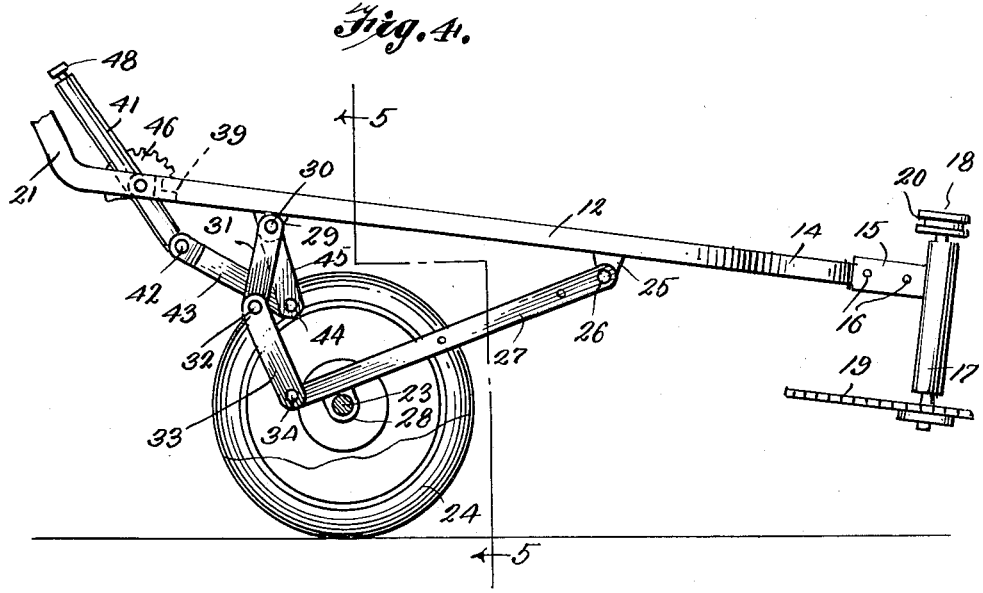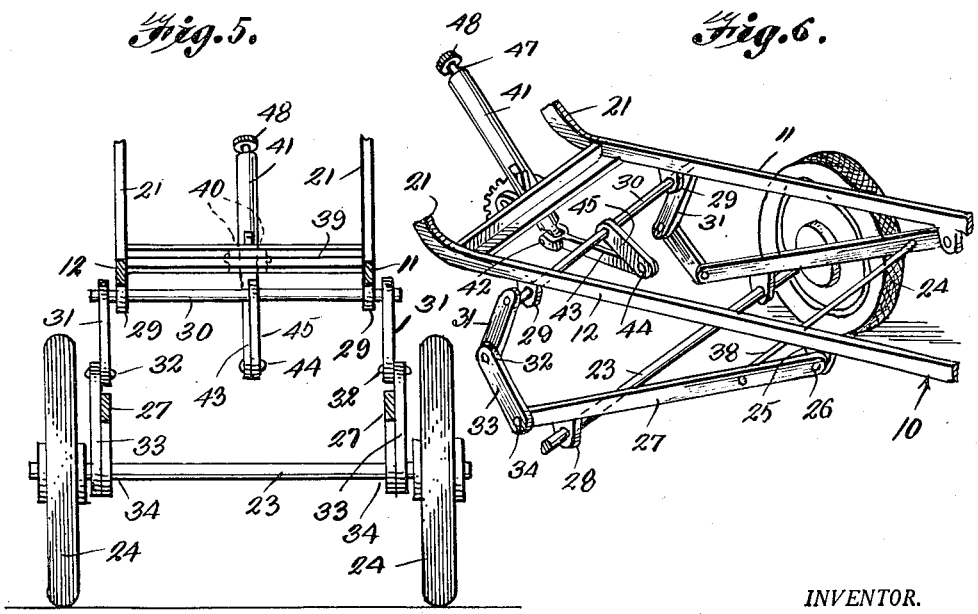

United States Patent Office 2,708,464
Patented May 17, 1955

2,708,464

PORTABLE TIMBER CUTTING SAW APPARATUS

Joseph Otradovec, Bolivar, Mo.

Application July 31, 1953, Serial No. 371,685

1 Claim. (Cl. 143—43)

The present invention relates to a portable timber cutting saw apparatus and it consists in the combinations, constructions and arrangements of parts herein described and claimed.

Generally there is provided a portable saw which consists essentially of a frame mounted upon a pair of supporting wheels and having a motor operated saw carried dependently at the forward end of the frame, the saw being of the circular type and lying in a substantially horizontal plane. Means is provided for raising and lowering the frame with respect to the ground so that the saw may be used at different heights with respect to the ground.

It is accordingly an object of the invention to provide a device of the character set forth which is simple in construction, inexpensive to manufacture and yet effective and efficient in use.

Another object of the invention is to provide, in a device of the character set forth, means for raising and lowering a frame forming a part of the invention.

Other and further objects of the invention will become apparent from a reading of the following specification taken in conjunction with the drawing, in which:

Figure 1 is a side elevational view of an embodiment of the invention showing a frame forming a part of the invention in lowered position, Figure 2 is a plan view of Figure 1, Figure 3 is a sectional view taken along line 3—3 of Figure 1, Figure 4 is a view similar to Figure 1 but showing the device in raised position, Figure 5 is a sectional view taken substantially along line 5—5 of Figure 4, and Figure 6 is a fragmentary perspective view illustrating certain details of construction of the device illustrated in Figures 1 to 5, inclusive.

Referring more particularly to the drawing, there is shown therein a device of the character set forth comprising a generally horizontally extending frame which is generally indicated at 10 and which comprises a pair of longitudinally extending side bars 11 and 12. The forward end of the side bar 11 extends forwardly in substantially a straight line but the forward end of the side bar 12 is bent toward the forward portion of the side bar 11, as indicated at 14 where the two forward end portions of the side bars 11 and 12 are encompassed by a bracket 15 having bolts 16 or the like extending therethrough and through the portions of the side bars encompassed thereby. A vertically extending collar 17 is affixed to the forward end of the bracket 15 and has extending therethrough a revoluble shaft 18 to the lower end of which is affixed a circular saw 19 and to the upper end of which is affixed a pulley 20 which is adapted to be connected operably with a motor (not shown) carried by the frame 10.

The rearward ends of the side bars 11 and 12 have integrally formed therewith upwardly and rearwardly extending handles 21 which are interconnected at their upper end portions with a handle bar 22. An axle 23 has mounted at either end thereof a supporting wheel 24. Each of the side bars 11 and 12 is provided centrally with a dependent ear 25 and each of such ears has pivoted thereto, as indicated at 26, a rearwardly extending arm 27 which is, in turn, provided in each case with a dependent ear 28 adjacent the rearward end thereof, the ears 28 encircling the axle 23.

Each of the side bars 11 and 12 is provided adjacent its rear end with a dependent ear 29 and a shaft 30 is revolubly mounted in the ears 29. At either end of the shaft 30 there is affixed one end of an arm 31, the other end of which is pivotally connected, as indicated at 32, to a link 33 which is pivotally connected, in turn, to the rearward end of the arm 27 on that side of the frame 10, as indicated at 34.

A V-shaped brace member 35 has its legs affixed to the arms 27 by bolts or the like, as shown at 36 and has its apex portion affixed by a bolt 37 to a cross bar 38 interconnecting the forward portions of the arms 27.

A cross bar 39 preferably formed of angle iron or the like interconnects the rearward portions of the side bars 11 and 12 and has affixed thereto upon the rearward side thereof a pair of ears 40 between which is pivotally mounted a lever 41 whose lower end is pivotally connected, as indicated at 42, to a link 43 whose forward end is pivotally connected, as shown at 44, to an arm 45 which is affixed to the shaft 30.

A segmental plate 46 is also affixed to the member 39 and a latch shaft 47 extends through the lever 41 to engage the segmental plate 46 and is provided at its outer end with an operating handle 48.

In operation, it will be apparent that normally the device of the present invention will assume the position shown in Figure 1, that is to say its lowered position, at which time the saw 19 will lie in a lowermost position, that is to say in a horizontal plane but slightly removed from the surface of the ground. When, however, it is desired to raise the saw 19 with respect to the ground, it is only necessary to grasp the lever 41 and move the same in a counterclockwise direction, as shown in Figure 1, for example, first, however, manipulating the handle 48 to release the lever from engagement with the segmental plate 46. This action will cause a forward movement of the link 43 and a consequent counterclockwise movement of the arm 45 to thus revolve the shaft 30 likewise in a counterclockwise direction as viewed, for example, in Figure 6. This action will cause a forward movement of the lower end of the arm 31 and a clockwise movement of the link 33 thus forcing the frame 10 in an upward direction. At this time the frame 10 will assume the position shown in Figure 4, that is to say a position in which it lies in a forwardly and downwardly directed plane. To correct the position of the saw 19 when the device is in this latter position, it is only necessary to press downwardly upon the handles 21 or handle bar 22 to again bring the saw 19 to a horizontal position where it will be at a much greater height from the ground than it was, for example, in Figure 1. It will also be apparent that by locking the lever 41 in the various teeth of the segmental plate 46, various heights from the ground may be attained for the saw 19.

While but one form of the invention has been shown and described herein, it will be readily apparent to those skilled in the art that many minor modifications may be made without departing from the spirit of the invention or the scope of the appended claim.

What is claimed is:

A device of the character described comprising a frame including a pair of frame side members, a horizontally disposed circular saw dependently carried by the forward end of said frame, a chassis including a pair of chassis side members each pivotally connected at its forward end to a frame side member, a transverse shaft revolubly mounted in said frame adjacent the rear of said chassis, upwardly and rearwardly extending handles formed integrally with each of said frame side members, a lever affixed to each end of said transverse shaft, a link interconnecting each of said levers with the rearward end of one of said chassis side members, a dependent lever centrally affixed to said shaft, a cross bar interconnecting said handles, a segmental plate centrally affixed to said cross bar, an operating lever pivoted to said cross bar adjacent said plate, a link interconnecting the lower ends of said dependent lever and said operating lever, and means for locking said operaing lever in selected positions with said plate.

References Cited in the file of this patent

UNITED STATES PATENTS

| | | |
|---|---|---|
| 2,480,893 | Whittle | Sept. 6, 1949 |
| 2,497,639 | Underwood | Feb. 14, 1950 |

FOREIGN PATENTS

| | | |
|---|---|---|
| 84,732 | Switzerland | Apr. 16, 1920 |
| 125,455 | Australia | Sept. 12, 1947 |
| 126,747 | Australia | Feb. 6, 1948 |